United States Patent
Foxcroft et al.

(10) Patent No.: US 8,724,674 B2
(45) Date of Patent: May 13, 2014

(54) DISABLING SPREAD-SPECTRUM CLOCK SIGNAL GENERATION

(75) Inventors: Michael R. Foxcroft, Toronto (CA); Shirley Pui Shan Lam, Richmond Hill (CA); George A. W. Guthrie, Mississauga (CA); Alexander Shternshain, San Jose, CA (US); Mihir Doctor, Sunnyvale, CA (US); Krishna Sitaraman, Sunnyvale, CA (US); Jeff Herman, Sunnyvale, CA (US)

(73) Assignees: ATI Technologies ULC, E. Markham, Ontario (CA); Advanced Micro Devices, Inc., Sunnyvale, CA (US)

( * ) Notice: Subject to any disclaimer, the term of this patent is extended or adjusted under 35 U.S.C. 154(b) by 27 days.

(21) Appl. No.: 13/560,817

(22) Filed: Jul. 27, 2012

(65) Prior Publication Data

US 2014/0029646 A1 Jan. 30, 2014

(51) Int. Cl.
 *H04B 1/00* (2006.01)
(52) U.S. Cl.
 USPC ........... 375/130; 375/132; 375/135; 375/136; 375/146; 375/147
(58) Field of Classification Search
 CPC .. H04B 2215/067; H04B 15/02; H04B 15/04; H04B 1/707; H04B 2215/069; H04M 1/44; H02M 3/156; G06F 11/004; G06F 11/1604; G06F 11/20; G06F 1/08; G06F 1/10; H03L 7/00
 USPC ......... 375/130, 132, 135, 145, 146, 150, 219, 375/222, 269, 295, 299, 316, 322, 342, 346, 375/350
 See application file for complete search history.

(56) References Cited

U.S. PATENT DOCUMENTS

| | | | |
|---|---|---|---|
| 6,850,554 B1 * | 2/2005 | Sha et al. | 375/140 |
| 7,334,149 B1 * | 2/2008 | Wu | 713/500 |
| 7,680,173 B2 * | 3/2010 | Mallinson et al. | 375/130 |
| 7,825,707 B2 * | 11/2010 | Ebuchi | 327/156 |
| 8,415,996 B1 * | 4/2013 | Wong | 327/152 |
| 2007/0206659 A1 * | 9/2007 | Nakadaira | 375/130 |
| 2010/0229019 A1 * | 9/2010 | Huang et al. | 713/600 |
| 2013/0235906 A1 * | 9/2013 | Kim et al. | 375/144 |
| 2013/0335151 A1 * | 12/2013 | Schrom et al. | 331/34 |

\* cited by examiner

*Primary Examiner* — Hirdepal Singh
(74) *Attorney, Agent, or Firm* — Harrity & Harrity, LLP (57) ABSTRACT

A device may generate a clock signal using spread-spectrum clocking. The spread-spectrum clocking may modulate a frequency of the clock signal to produce a plurality of frequencies for the clock signal during a modulation cycle. The device may receive an instruction to disable the spread-spectrum clocking, and may disable the spread spectrum clocking at the end of the modulation cycle.

20 Claims, 6 Drawing Sheets

DISABLING SPREAD-SPECTRUM CLOCK SIGNAL GENERATION

BACKGROUND

In a digital device, a clock signal may be used to synchronize operations of multiple device components. The clock signal may oscillate with a particular frequency, which may produce electromagnetic interference ("EMI") at that frequency. The frequency with which the clock signal oscillates may be adjusted over time in order to spread the total amount of EMI over a wider frequency band, thus decreasing the amount of EMI produced at any one frequency.

SUMMARY

According to some embodiments, a device generates a clock signal using spread-spectrum clocking. The spread-spectrum clocking modulates a frequency of the clock signal to produce a plurality of frequencies for the clock signal during a modulation cycle. The device receives an instruction to disable the spread-spectrum clocking, and disables the spread spectrum clocking at the end of the modulation cycle.

According to some embodiments, a clock generator generates a clock signal using spread-spectrum clocking. The spread-spectrum clocking modulates a frequency of the clock signal to produce a plurality of frequencies for the clock signal during a modulation cycle. The clock generator receives a signal to disable the spread-spectrum clocking, and disables the spread spectrum clocking, based on the receive signal, at the end of the modulation cycle.

According to some embodiments, a device generates a clock signal using spread-spectrum clocking. The spread-spectrum clocking modulates a frequency of the clock signal to produce a plurality of frequencies for the clock signal during a modulation cycle. The device determines that the modulation cycle has expired, and receives an instruction to disable the spread-spectrum clocking after determining that the modulation cycle has expired. The device disables the spread spectrum clocking at the end of the modulation cycle in response to the received instruction.

DETAILED DESCRIPTION

The following detailed description of example embodiments refers to the accompanying drawings. The same reference numbers in different drawings may identify the same or similar elements.

In a digital device, a clock signal may oscillate with a particular frequency in order to synchronize operations of multiple device components. The frequency with which the clock signal oscillates may be adjusted over time in order to spread the EMI generated by the clock signal over a wider frequency band, thus decreasing the amount of EMI generated at any one frequency. This technique may be referred to herein as "spread-spectrum clocking"

In some embodiments, spread-spectrum clocking incrementally adjusts an output clock signal frequency between a first frequency and a second frequency, where the first frequency is higher than the second frequency. When the output clock signal is oscillating at the first frequency, the output clock signal frequency may be gradually decreased until it is equal to the second frequency. When the output clock signal is oscillating at the second frequency, the output clock signal frequency may be gradually increased until it is equal to the first frequency.

In some situations, it may be desirable to disable spread-spectrum clocking so that an output clock signal oscillates with a single desired frequency. However, disabling spread-spectrum clocking may cause system instability if the clock signal frequency jumps from one frequency (e.g., a spread-spectrum frequency at the time of disablement) to another frequency (e.g., the single desired frequency) as described below with reference to FIG. 1A. For example, a frequency jump may be the difference between the clock signal frequency at the moment before spread-spectrum clocking is disabled and the moment after spread-spectrum clocking is disabled. In another example, the frequency jump may be defined as a "jump discontinuity" at a point $x_0$ (e.g., time D in FIG. 1A) where a first function defining a spread signal that is used to modulate the clock signal frequency during spread-spectrum clocking (e.g., $f(x)=-x$) when $x<x_0$ and a function defining the nominal frequency (e.g., $f(x)=F_1$, where $F_1$ is a constant or some other function) when $x>x_0$ approach a different value on either side of $x_0$ (i.e., $x_0^-$ and $x_0^+$). Embodiments described herein may maintain system stability during disablement of spread-spectrum clocking by reducing overshoot due to a frequency jump.

Figure 1A:
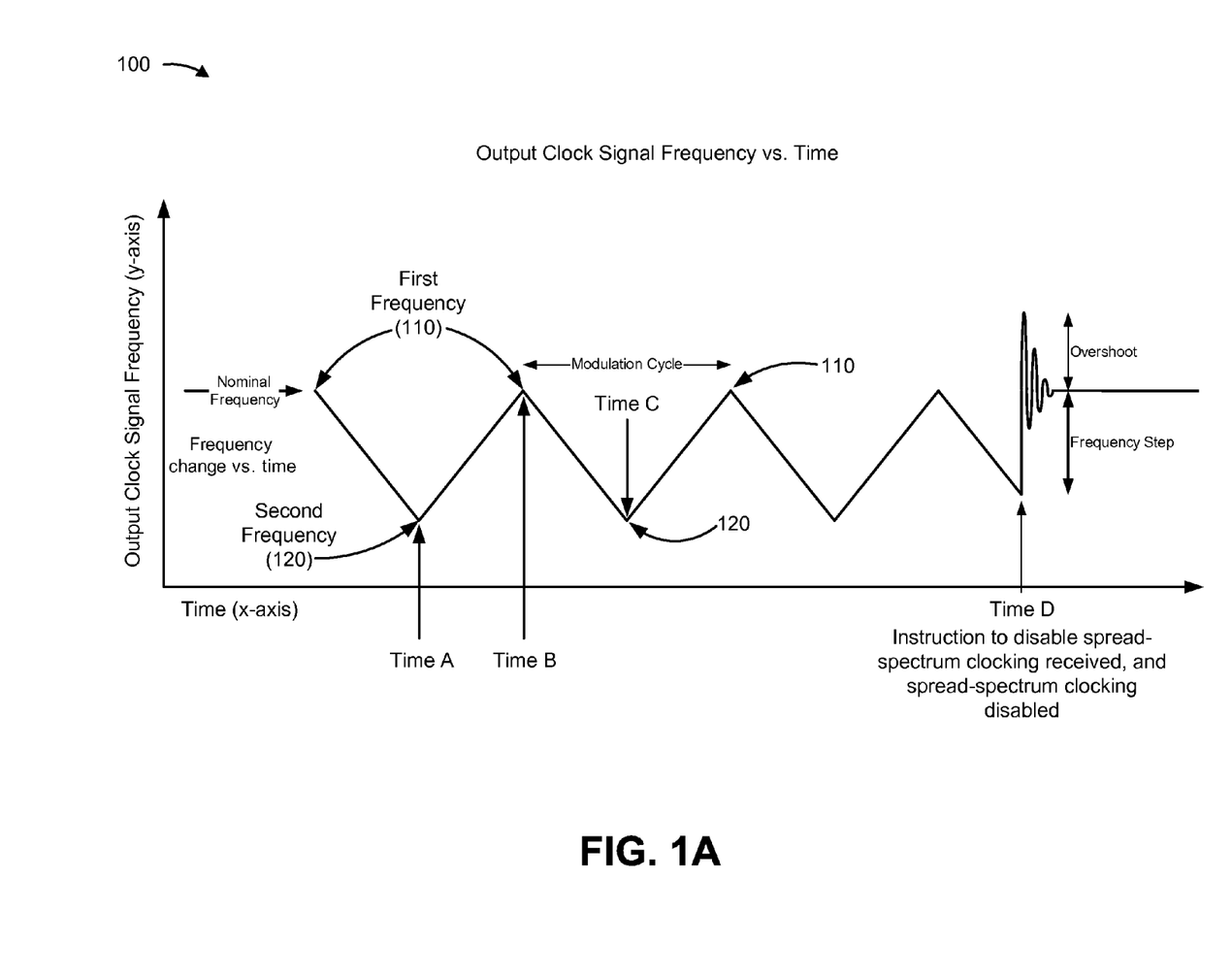
FIGS. 1A and 1B are example frequency-versus-time diagrams of an output clock signal, according to some embodiments.
Figure 1B:
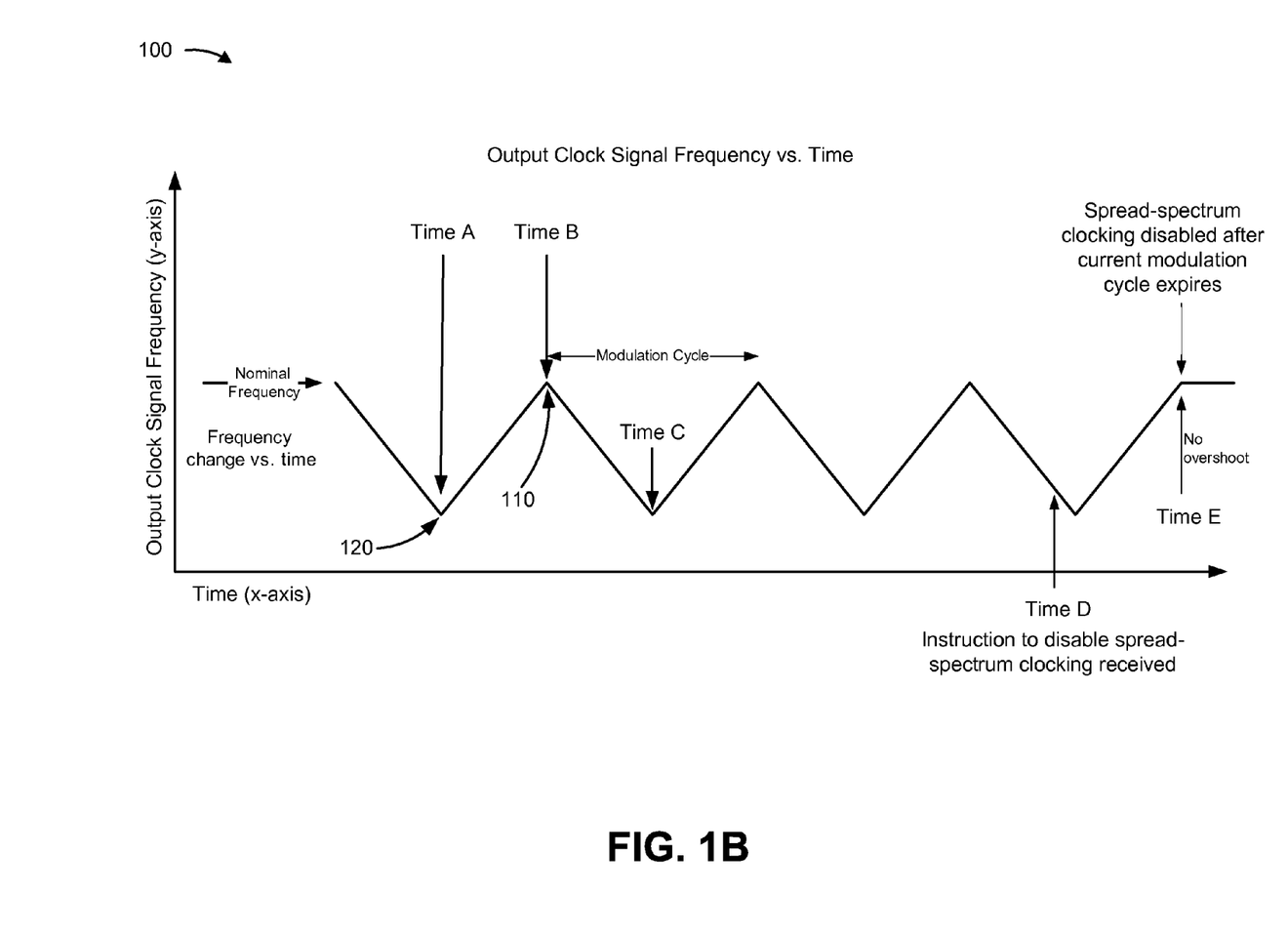

FIGS. 1A and 1B are example frequency-versus-time diagrams of an output clock signal, according to some embodiments. As illustrated in FIGS. 1A and 1B, an output clock signal (e.g., an output clock signal generated by a ramp generator) may be adjusted so that it varies in frequency over time. For example, the output clock signal may be generated at a first frequency 110. The output clock signal frequency may be incrementally adjusted until it is equal to a second frequency 120 at time A, as illustrated. Upon reaching second frequency 120, the clock signal frequency may be incrementally adjusted until it is equal to the first frequency 110 at time B, as illustrated. Upon reaching first frequency 110, the clock signal frequency may again be incrementally adjusted until it is equal to second frequency 120 at time C. The modulation cycle (e.g., the cycle between the first frequency 110 and the next occurrence of the first frequency 110, the cycle between the second frequency 120 and the next occurrence of the second frequency 120, etc.) may be repeated until an instruction is received to disable spread-spectrum clocking. As used herein, an instruction may include a signal.

As illustrated in FIG. 1A, an instruction to disable spread-spectrum clocking may be received in the middle of a modulation cycle (e.g., at time D), or at a time when the output clock signal frequency does not equal a desired and/or a nominal frequency. Disabling spread-spectrum clocking in response to receiving the instruction may cause the clock signal frequency to jump from a spread-spectrum frequency (e.g., at time D) to the desired frequency (e.g., a frequency jump by the illustrated "frequency step"). This jump may cause the output clock signal to overshoot the desired frequency, which in turn may result in system instability.

As illustrated in FIG. 1B, overshoot may be reduced or eliminated by eliminating the frequency jump between the spread-spectrum frequency at the time of spread-spectrum clocking disablement and the desired frequency. For example, an instruction to disable spread-spectrum clocking may be received in the middle of a modulation cycle (e.g., at time D, as illustrated). In some embodiments, the system may wait to disable spread-spectrum clocking until the end of the modulation cycle (e.g., at time E). In some embodiments, the system may wait to disable spread-spectrum clocking until a time when the current clock signal frequency equals the desired frequency. Disabling spread-spectrum clocking in this manner may prevent instabilities and other system problems caused by overshoot.

Figure 2:
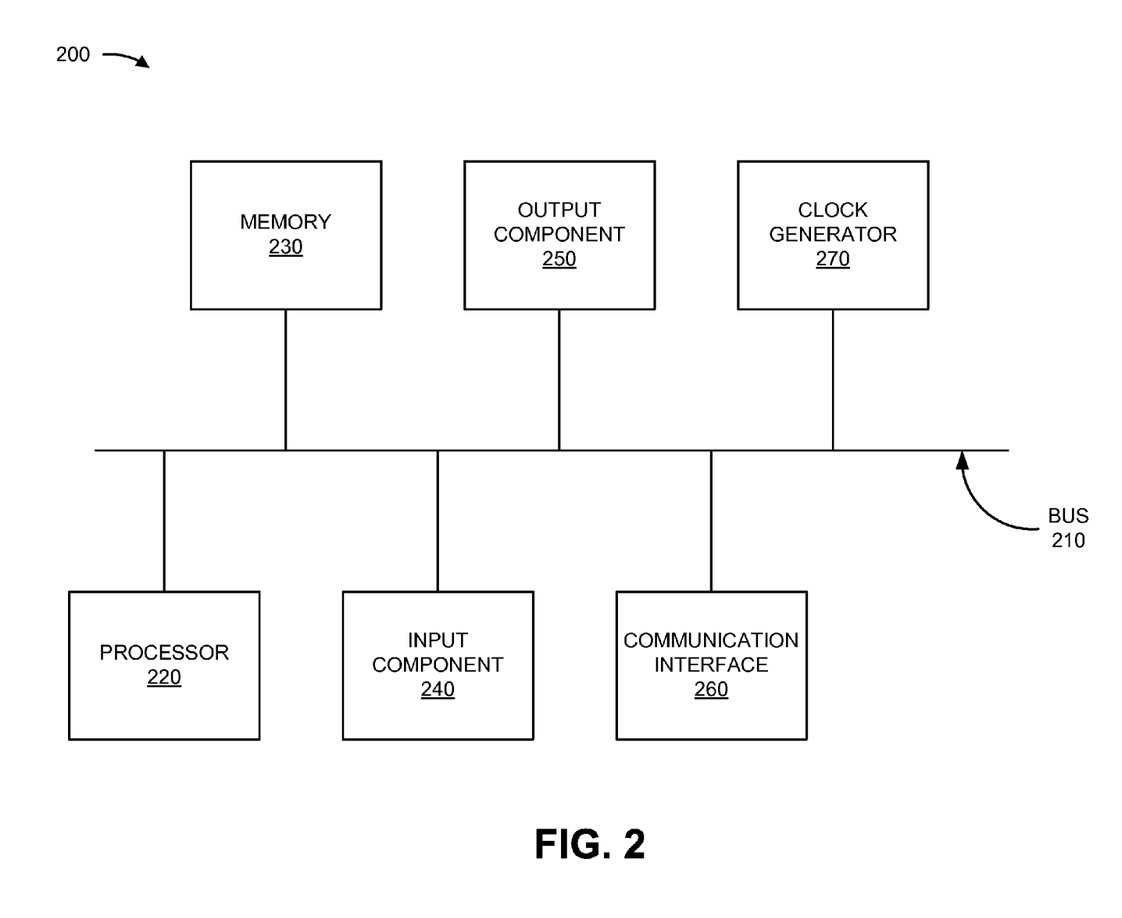
FIG. 2 is a diagram of an example device in which the embodiments described herein may be implemented, according to some embodiments.

FIG. 2 is a diagram of an example device 200 in which systems and/or methods described herein may be implemented, according to some embodiments. As illustrated in FIG. 2, device 200 may include a bus 210, a processor 220, memory 230, an input component 240, an output component 250, a communication interface 260, and a clock generator 270 (e.g., a clock generation circuit).

The number of components illustrated in FIG. 2 is provided for explanatory purposes. In practice, there may be additional components, fewer components, different components, or differently arranged components than are shown in FIG. 2. For example, device 200 may include two or more processors 220. Furthermore, two or more of the components illustrated in FIG. 2 may be implemented within a single component, or a single component illustrated in FIG. 2 may be implemented as multiple, distributed components. Additionally, or alternatively, one or more of the components of device 200 may perform one or more functions described as being performed by another one or more of the components of device 200.

Bus 210 may include a path that permits communication among the components of device 200. Processor 220 may include a processor, a microprocessor, and/or any processing logic (e.g., a field-programmable gate array ("FPGA"), an application-specific integrated circuit ("ASIC"), etc.) that interprets and/or executes instructions. In some embodiments, processor 220 may include one or more processor cores. Memory 230 may include a random access memory ("RAM"), a read only memory ("ROM"), and/or any type of dynamic or static storage device (e.g., a flash, magnetic, or optical memory) that stores information and/or instructions for use by processor 220.

Input component 240 may include any mechanism that permits a user to input information to device 200 (e.g., a keyboard, a keypad, a mouse, a button, a switch, etc.). Output component 250 may include any mechanism that outputs information from device 200 (e.g., a display, a speaker, one or more light-emitting diodes ("LEDs"), etc.).

Communication interface 260 may include any transceiver-like mechanism, such as a transceiver and/or a separate receiver and transmitter, that enables device 200 to communicate with other devices and/or systems, such as via a wired connection, a wireless connection, or a combination of wired and wireless connections. For example, communication interface 260 may include mechanisms for communicating with another device and/or system via a network. Additionally, or alternatively, communication interface 260 may be a logical component that includes input and output ports, input and output systems, and/or other input and output components that facilitate the transmission of data to and/or from other devices, such as an Ethernet interface, an optical interface, a coaxial interface, an infrared interface, a radio frequency ("RF") interface, a universal serial bus ("USB") interface, or the like.

Clock generator 270 may include a mechanism that produces a timing signal (e.g., a clock signal) to assist in synchronizing operations of one or more components of device 200. For example, clock generator 270 may include an oscillator (e.g., a crystal oscillator, a quartz piezo-electric oscillator, an LC oscillator, an RC oscillator, a linear oscillator, a relaxation oscillator, etc.). Additionally, or alternatively, clock generator 270 may include a phase-locked loop ("PLL") circuit. Clock generator 270 may transmit the timing signal to another device and/or component (e.g., components 210-260), so that the device and/or component can perform synchronized operations. In some embodiments, one or more components 210-260 may include clock generator 270.

Device 200 may perform various operations described herein. Device 200 may perform these operations in response to processor 220 executing software instructions included in a computer-readable medium, such as memory 230. A computer-readable medium may be defined as a non-transitory memory device. A memory device may include space within a single storage device or space spread across multiple storage devices.

Software instructions may be read into memory 230 from another computer-readable medium or from another device via communication interface 260. When executed, software instructions stored in memory 230 cause processor 220 to perform one or more processes that are described herein. Additionally, or alternatively, hardwired circuitry may be used in place of or in combination with software instructions to perform processes described herein. Thus, embodiments described herein are not limited to any specific combination of hardware circuitry and software.

Figure 3:
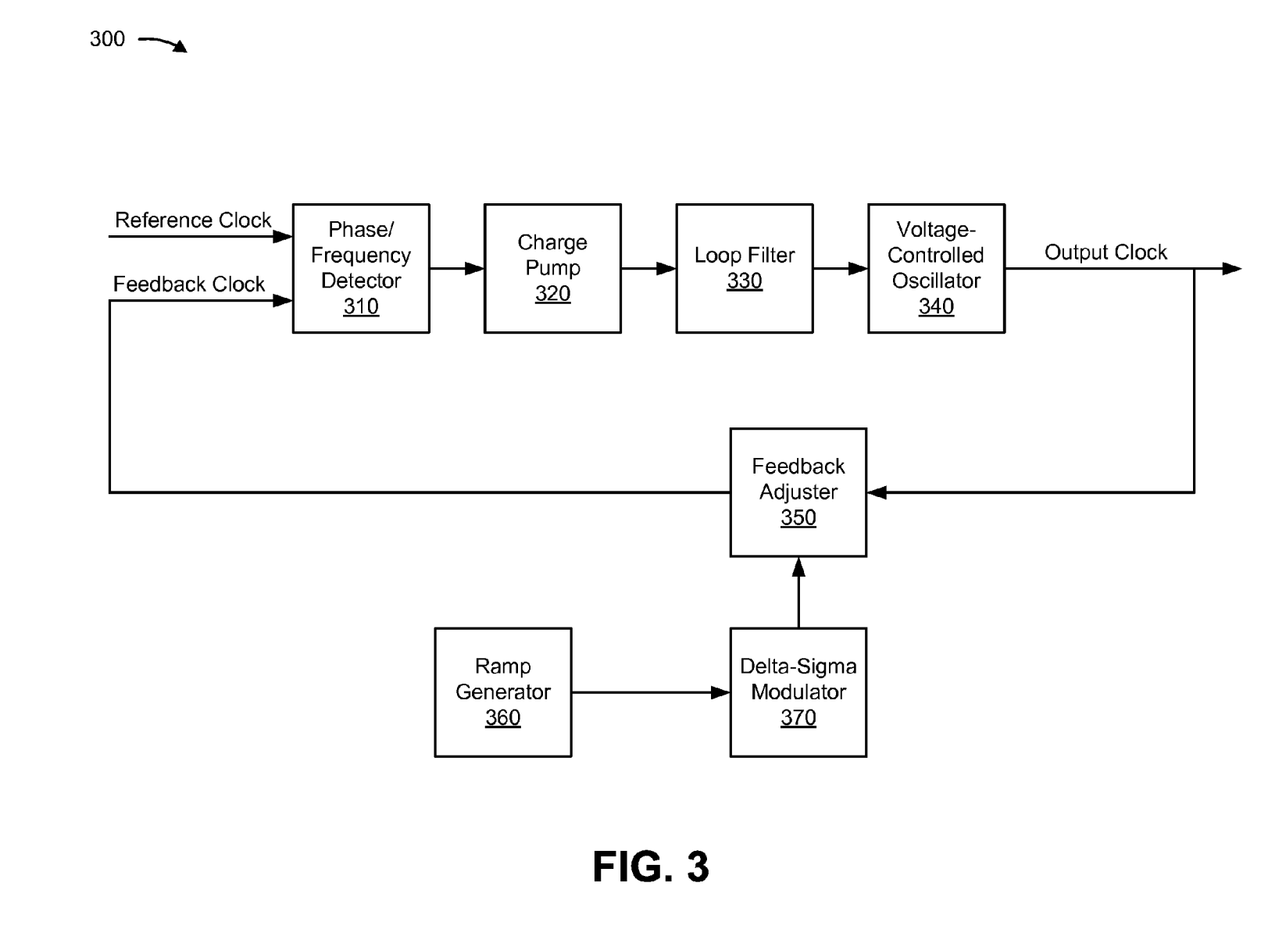
FIG. 3 is a diagram of example components of a device in which the embodiments described herein may be implemented, according to some embodiments.

FIG. 3 is a diagram of example components of a device 300 that may correspond to clock generator 270, according to some embodiments. In some embodiments, device 300 includes a PLL circuit. One or more PLL circuits may be included in clock generator 270 and/or another device. As illustrated in FIG. 3, device 300 may include a phase/frequency detector ("PFD") 310, a charge pump 320, a loop filter 330, a voltage-controlled oscillator ("VCO") 340, a feedback adjuster 350, a ramp generator 360, and a delta-sigma modulator ("DSM") 370. In some embodiments, clock generator 270 may include additional components, fewer components, different components, or differently arranged components than those shown in FIG. 3.

In some embodiments, PFD 310 compares a reference clock signal and a feedback clock signal to produce an error signal based on the comparison. For example, the error signal may be proportional to the phase and/or frequency difference of the two input signals. PFD 310 may produce more than one error signal based on a phase difference and a frequency difference of the input signals.

In some embodiments, the reference clock signal includes a signal received by PFD 310 from a reference oscillator (e.g., a master oscillator, a crystal oscillator, etc.). Additionally, or alternatively, a clock signal frequency from a reference oscillator may be adjusted (e.g., by a frequency divider, a frequency multiplier, a frequency mixer, etc.) before being received by PFD 310 as the reference clock signal. The feedback clock signal may be a signal transmitted by feedback adjuster 350.

In some embodiments, PFD 310 transmits an error signal (e.g., associated with a phase and/or frequency error) to charge pump 320. Charge pump 320 may generate a signal with a charge proportional to the error signal received from PFD 310. The signal generated by charge pump 320 may be used to tune VCO 340 in order to generate an output clock signal at a desired frequency. In some embodiments, charge pump 320 includes a bang-bang charge pump and/or a proportional charge pump.

In some embodiments, loop filter 330 may filter a signal received from charge pump 320. Loop filter 330 may transmit the filtered signal to VCO 340. Loop filter 330 may include a low-pass filter, a high-pass filter, or a band-pass filter. For example, loop filter 330 may include a low-pass filter that allows low-frequency signals to pass, but attenuates signals with frequencies higher than a specified threshold.

In some embodiments, VCO 340 produces an output clock signal based on a signal received from loop filter 330. Recall that the signal generated by the loop filter may be a function of the signal generated by the charge pump 320, which in turn may be a function of the signal generated by the PFD 310. Thus, the output clock signal may be a function of these signals. For example, if the phase and/or frequency of the reference clock and the feedback clock drift apart, the error signal produced by PFD 310 may increase (e.g., in voltage). This increased error signal may change the phase and/or frequency of the output clock signal produced by VCO 340 so that the error signal is reduced (e.g., so that the reference clock and the feedback clock have the same phase and/or frequency).

The output clock signal may be transmitted to feedback adjuster 350, which may adjust characteristics (e.g., a frequency, an amplitude, a phase, etc.) of the output clock signal based on an adjustment value to produce the feedback clock signal that is transmitted back to PFD 310. Feedback adjuster 350 may include a frequency divider, a frequency multiplier, and/or a frequency mixer. The adjustment value (e.g., the divider value, the multiplier value, the mixer value, etc.) applied by feedback adjuster 350 to adjust the output clock signal may be modulated by DSM 370. DSM 370 may generate the adjustment value based on a spread signal generated by ramp generator 360. Ramp generator 360 may generate the spread signal based on a spread pattern. In some embodiments, the spread pattern may be a user-specified spread pattern. In some embodiments, the spread pattern may be a system-specified spread pattern.

In some embodiments, the output clock signal produced by VCO 340 is provided to other devices and/or components in order to synchronize operations associated with those devices and/or components.

In some embodiments, the spread pattern may include a function based on time, such as a cyclical and/or periodic function (e.g., the triangular periodic function depicted in FIGS. 1A and 1B, a square periodic function, a sawtooth periodic function, a sinusoidal function, etc.). In some embodiments, ramp generator 360 may produce a spread signal with a particular characteristic (e.g., a frequency, an amplitude, a phase) based on the spread pattern.

In some embodiments, the spread pattern may be used to down-spread a clock signal (e.g., the output clock signal). Down-spreading involves decreasing the clock signal frequency to a target frequency (e.g., a specified frequency, a percentage of the original clock frequency, etc.) and increasing the clock signal frequency back to the original clock signal frequency. Additionally, or alternatively, the spread pattern may be used to up-spread the clock signal. Up-spreading involves increasing the clock signal frequency to a target frequency and decreasing the clock signal frequency back to the original clock signal frequency. Additionally, or alternatively, the spread pattern may be used to center-spread the clock signal. Center-spreading involves increasing and decreasing the clock signal frequency between two target frequencies, where the original clock signal frequency is somewhere between the two target frequencies. For example, the original clock signal frequency may be the average of the two target frequencies.

In some embodiments, ramp generator 360 generates a spread signal with a frequency that varies over time, based on the spread pattern. The spread pattern may indicate that when a characteristic of a spread signal generated by ramp generator 360 is equal to a particular value, ramp generator 360 should adjust the characteristic of the generated spread signal. For example, ramp generator 360 may generate multiple spread signals over time, where each spread signal has a frequency that varies between a first frequency level and a second frequency level (e.g., based on the spread pattern).

In some embodiments, the first frequency level may be higher than the second frequency level. After ramp generator 360 generates a spread signal at the first frequency level, ramp generator 360 may incrementally adjust the frequency of each additional transmitted spread signal until a transmitted spread signal has a frequency equal to the second frequency level. After ramp generator 360 generates a spread signal at the second frequency level, ramp generator 360 may incrementally adjust the frequency of each additional transmitted spread signal until a transmitted spread signal has a frequency equal to the first frequency level.

For example, the spread pattern may specify a first frequency value and a second frequency value. Ramp generator 360 may generate a first spread signal with the first frequency value, and may decrement the frequency value of each additional generated spread signal until a spread signal with the second frequency value is generated. When ramp generator 360 generates a spread signal with the second frequency value, ramp generator 360 may increment the frequency value of each additional generated spread signal until a spread signal with the first frequency value is generated. Ramp generator 360 may continue to generate spread signals in this manner until ramp generator 360 receives an instruction to disable spread-spectrum clocking.

In some embodiments, the spread pattern may be a linear function that varies a spread signal between a first frequency level and a second frequency level over time. Additionally, or alternatively, the spread pattern may be a parabolic function, or any other function of time.

Ramp generator 360 may use any specified granularity to adjust a received signal during a time period. Ramp generator 360 may use the specified granularity to divide the time period into a set of time increments. A time increment may be expressed as a particular interval of time (e.g., a second, a microsecond, a nanosecond, a picosecond, etc.), and/or may be expressed in terms of a quantity of modulation cycles and/or feedback loops (e.g., a time increment may be expressed in terms of a count of times that VCO 340 sends a signal to the feedback loop, a count of times that ramp generator 360 generates a spread signal, etc.).

DSM 370 may modulate a signal received by feedback adjuster 350 based on a spread signal received from ramp generator 360. In some embodiments, DSM 370 adjusts a signal characteristic (e.g., a frequency) based on a spread signal received from ramp generator 360. Additionally, or alternatively, DSM 370 may dither a signal received by feedback adjuster 350 to generate a fractional feedback clock signal. The clock signal generated by feedback adjuster 350 and modulated by DSM 370 may be transmitted as the feedback clock signal to PFD 310.

Figure 4:
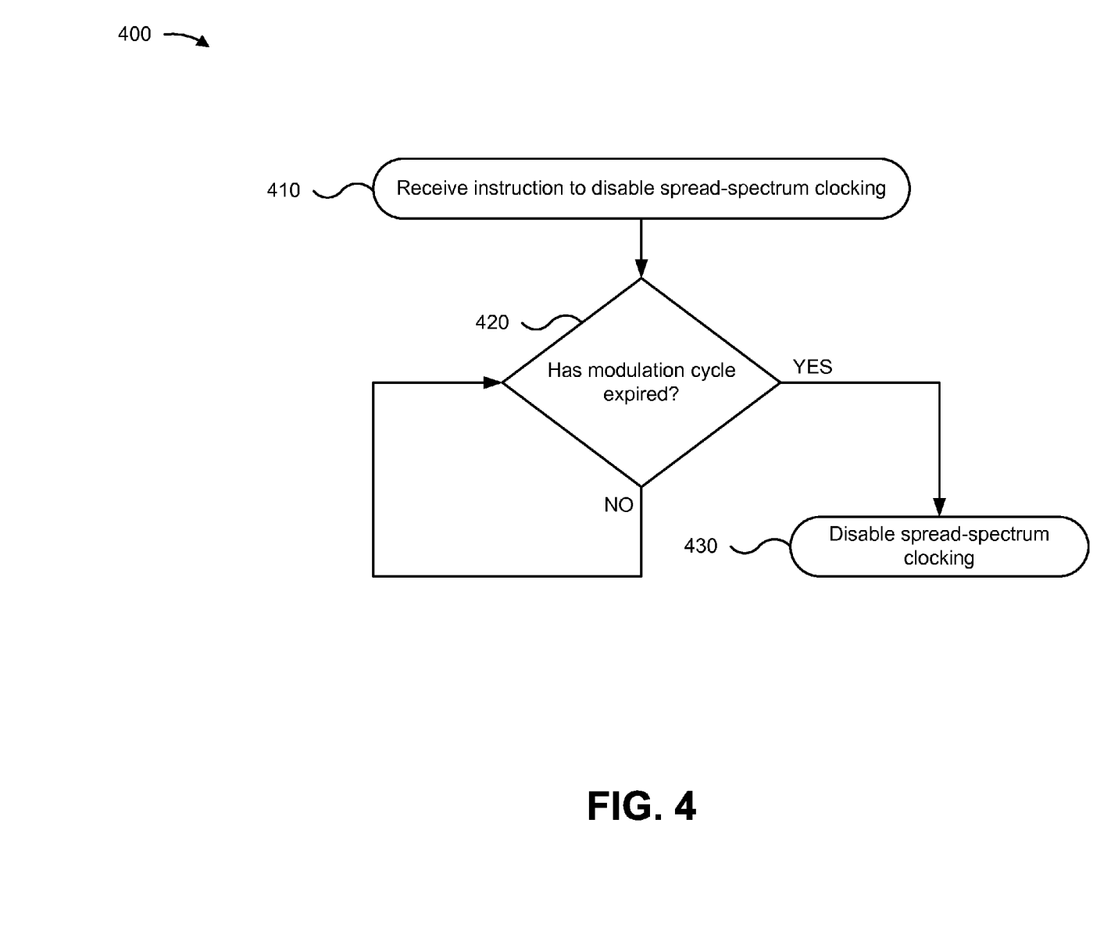
FIG. 4 is a diagram of an example process for disabling spread-spectrum clock signal generation, according to some embodiments.

FIG. 4 is a diagram of an example process 400 for disabling spread-spectrum clock signal generation, according to some embodiments. In some embodiments, one or more process blocks of FIG. 4 may be performed by device 200 and/or by one or more components of device 200, such as ramp generator 360.

As shown in FIG. 4, process 400 may include receiving an instruction to disable spread-spectrum clocking (block 410). In some embodiments, ramp generator 360 receives the instruction (e.g., input by a user and/or generated by a device component) to disable spread-spectrum clocking. In some embodiments, ramp generator 360 continuously monitors and/or listens for the instruction. Additionally, or alternatively, ramp generator 360 may periodically check for the instruction (e.g., with a period that is equal to, greater than, or less than a modulation cycle indicated by a spread pattern). Referring back to FIGS. 1A and 1B, ramp generator 360 may receive the instruction to disable spread-spectrum clocking at time D.

As further shown in FIG. 4, process 400 may include determining whether a modulation cycle has expired (block 420). A modulation cycle may be identified by a spread pattern. Referring back to FIGS. 1A and 1B, a modulation cycle may be identified by adjacent peaks, crests, and/or maximums in a spread pattern (e.g., illustrated by the modulation cycle of FIGS. 1A and 1B). Additionally, or alternatively, a modulation cycle may be identified by adjacent valleys, troughs, and/or minimums in a spread pattern (e.g., the cycle between time A and time C, as illustrated in FIGS. 1A and 1B). Additionally, or alternatively, a modulation cycle may be identified by a period of time (e.g., a millisecond, a clock cycle, etc.). Additionally, or alternatively, a modulation cycle may be identified by a transition from a first frequency to the next occurrence of the first frequency. Additionally, or alternatively, a modulation cycle may be identified by a transition from a first frequency to a second frequency other than the first frequency.

Ramp generator 360 may determine that a modulation cycle has expired when the spread pattern indicates that ramp generator 360 should generate a signal with the first frequency in the spread pattern (e.g., at time B or time E), and/or with the second frequency in the spread pattern (e.g., at time A or time C). Additionally, or alternatively, ramp generator 360 may receive an indication of a desired frequency. Ramp generator 360 may determine that a modulation cycle has expired when the spread pattern indicates that ramp generator 360 should generate a signal with the desired frequency.

If the modulation cycle has not expired (block 420—NO), process 400 may return to process block 420, and ramp generator 360 may continue to determine whether the modulation cycle has expired. Ramp generator 360 may continue to generate signals based on the spread pattern until the modulation cycle has expired.

If the modulation cycle has expired (block 420—YES), process 400 may include disabling spread-spectrum clocking (block 430). In some embodiments, ramp generator 360 may generate signals based on a constant (e.g., flat) spread pattern. Additionally, or alternatively, ramp generator 360 may be disabled, and may not assist in adjusting a signal to be used as a reference clock input to PFD 310.

Figure 5:
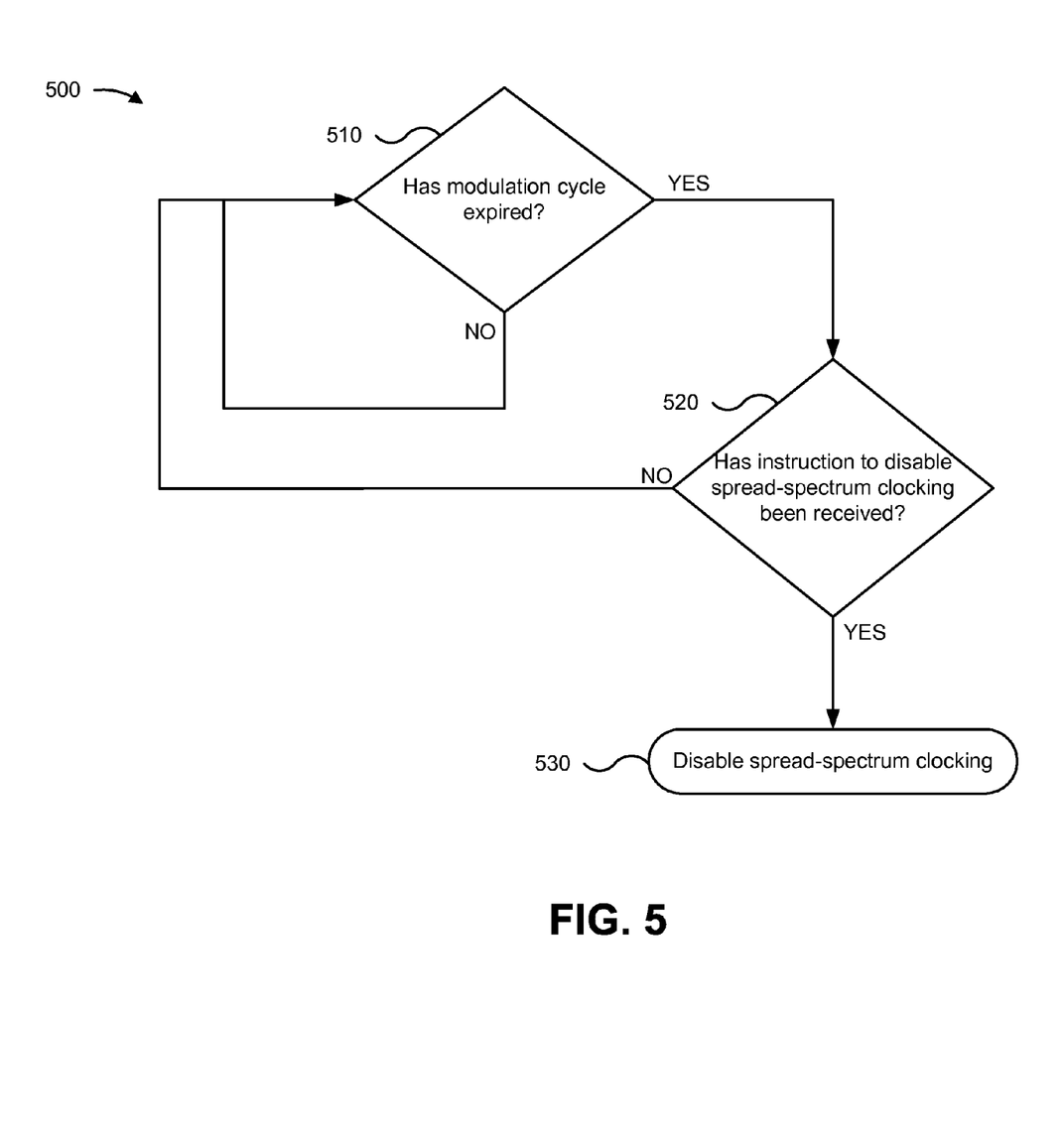
FIG. 5 is a diagram of another example process for disabling spread-spectrum clock signal generation, according to some embodiments.

FIG. 5 is a diagram of another example process 500 for disabling spread-spectrum clock signal generation, according to some embodiments. In some embodiments, one or more process blocks of FIG. 5 may be performed by device 200 and/or by one or more components of device 200, such as ramp generator 360.

As shown in FIG. 5, process 500 may include determining whether a modulation cycle has expired (block 510). As described herein in connection with FIG. 4, ramp generator 360 may determine that a modulation cycle has expired when the spread pattern indicates that ramp generator 360 should generate a signal with the first frequency in the spread pattern, the second frequency in the spread pattern, and/or at a desired frequency (e.g., a frequency specified by a user and/or a system).

If the modulation cycle has not expired (block 510—NO), process 500 may return to process block 510, and ramp generator 360 may continue to determine whether the modulation cycle has expired. Ramp generator 360 may continue to generate signals based on the spread pattern until the modulation cycle has expired.

If the modulation cycle has expired (block 510—YES), process 500 may include determining whether an instruction to disable spread-spectrum clocking has been received. In some embodiments, ramp generator 360 may periodically determine whether an instruction to disable spread-spectrum clocking has been received. For example, ramp generator 360 may check at the end of a modulation cycle to determine whether an instruction to disable spread-spectrum clocking has been received.

If an instruction to disable spread-spectrum clocking has not been received (block 520—NO), process 500 may return to process block 510, and ramp generator 360 may continue to determine whether the modulation cycle has expired.

If an instruction to disable spread-spectrum clocking has been received (block 520—YES), process 500 may include disabling spread-spectrum clocking (block 530). Ramp generator 360 may disable spread-spectrum clocking as described herein in connection with FIG. 4.

Embodiments described herein may avoid system instabilities and inefficiencies associated with disabling spread-spectrum clocking. This may be achieved by using a ramp generator to smoothly transition from a spread-spectrum frequency to a desired frequency.

The foregoing disclosure provides illustration and description, but is not intended to be exhaustive or to limit the embodiments to the precise form disclosed. Modifications and variations are possible in light of the above disclosure or may be acquired from practice of the embodiments.

While series of blocks have been described with regard to FIGS. 4 and 5, the order of the blocks may be modified in some embodiments. Further, non-dependent blocks may be performed in parallel.

As used herein, the term "component" is intended to be broadly construed as hardware, firmware, or a combination of hardware and software.

It will be apparent that systems and/or methods, as described herein, may be implemented in many different forms of software, firmware, and hardware in the embodiments illustrated in the figures. The actual software code or specialized control hardware used to implement these systems and/or methods is not limiting of the embodiments. Thus, the operation and behavior of the systems and/or methods were described without reference to the specific software code—it being understood that software and control hardware can be designed to implement the systems and/or methods based on the description herein. The software may also include hardware description language (HDL), Verilog, Register Transfer Level (RTL), Graphic Database System (GDS) II data or the other software used to describe circuits and arrangement thereof. Such software may be stored in a computer readable media and used to configure a manufacturing process to create physical circuits capable of operating in manners which embody aspects of the embodiments described herein.

Even though particular combinations of features are recited in the claims and/or disclosed in the specification, these combinations are not intended to limit the disclosure of possible embodiments. In fact, many of these features may be combined in ways not specifically recited in the claims and/or disclosed in the specification. Although each dependent claim listed below may directly depend on only one claim, the disclosure of possible embodiments includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   generating, by a device, a clock signal using spread-spectrum clocking,
   the spread-spectrum clocking modulating a frequency of the clock signal to produce a plurality of frequencies for the clock signal during a modulation cycle, and
   the spread-spectrum clocking modulating the frequency of the clock signal based on a periodic function that includes a first frequency and a second frequency;
   receiving, by the device, an instruction to disable the spread-spectrum clocking; and
   disabling, by the device, the spread spectrum clocking at an end of the modulation cycle.

2. The method of claim 1, where the device comprises a clock generation circuit that includes a phased-locked loop.

3. The method of claim 1, where the disabling the spread spectrum clocking comprises disabling the spread spectrum clocking when a spread signal is generated at the first frequency, the first frequency being higher than the second frequency.

4. The method of claim 1, where the disabling the spread spectrum clocking comprises disabling the spread spectrum clocking when a spread signal is generated at the second frequency, the second frequency being lower than the first frequency.

5. The method of claim 1, where the disabling the spread spectrum clocking comprises disabling the spread spectrum clocking when a spread signal is generated at a user-specified frequency.

6. The method of claim 1, where, when receiving the instruction to disable the spread-spectrum clocking, the method includes:
   periodically checking for the instruction.

7. The method of claim 1, further comprising:
   determining the end of the modulation cycle using at least one of:
   a spread pattern, or
   transition information associated with the first frequency.

8. A system comprising:
   a clock generator to:
   generate a clock signal using spread-spectrum clocking,
   the spread-spectrum clocking modulating a frequency of the clock signal to produce a plurality of frequencies for the clock signal during a modulation cycle, and
   the spread-spectrum clocking modulating the frequency of the clock signal based on a function that includes a first frequency and a second frequency;
   receive a signal to disable the spread-spectrum clocking; and
   disable, based on the received signal, the spread spectrum clocking at an end of the modulation cycle.

9. The system of claim 8, where the clock generator includes a phased-locked loop.

10. The system of claim 8, where the clock generator, when disabling the spread spectrum clocking, is further to:
    disable the spread spectrum clocking when a spread signal is generated at the first frequency, the first frequency being higher than the second frequency.

11. The system of claim 8, where the clock generator, when disabling the spread spectrum clocking, is further to:
    disable the spread spectrum clocking when a spread signal is generated at the second frequency, the second frequency being lower than the first frequency.

12. The system of claim 8, where the clock generator, when disabling the spread spectrum clocking, is further to:
    disable the spread spectrum clocking when a spread signal is generated at a user-specified frequency.

13. The system of claim 8, where the clock generator, when receiving the signal to disable the spread-spectrum clocking, is further to:
    periodically check for the signal.

14. The system of claim 8, where the clock generator is further to:
    determine the end of the modulation cycle using at least one of:
    a spread pattern, or
    transition information associated with the first frequency.

15. A method comprising:
    generating, by a device, a clock signal using spread-spectrum clocking,
    the spread-spectrum clocking modulating a frequency of the clock signal to produce a plurality of frequencies for the clock signal during a modulation cycle, and
    the spread-spectrum clocking modulating the frequency of the clock signal based on a periodic function that includes a first frequency and a second frequency;
    determining, by the device, that the modulation cycle has expired;
    determining, by the device, that an instruction to disable the spread-spectrum clocking has been received; and
    disabling, by the device and based on the received instruction, the spread-spectrum clocking at an end of the modulation cycle.

16. The method of claim 15, where the device comprises a clock generation circuit that includes a phased-locked loop.

17. The method of claim 15, where the disabling the spread spectrum clocking comprises disabling the spread spectrum clocking when a spread signal is generated at the first frequency, the first frequency being higher than the second frequency.

18. The method of claim 15, where the disabling the spread spectrum clocking comprises disabling the spread spectrum clocking when a spread signal is generated at a user-specified frequency.

19. The method of claim 15, where, when determining that the instruction to disable the spread-spectrum clocking has been received, the method includes:
    periodically checking for the instruction.

20. The method of claim 15, where, when determining that the modulation cycle has expired, the method includes:

determining that the modulation cycle has expired using at least one of:

a spread pattern, or transition information associated with the first frequency.

* * * * *